United States Patent [19]

Hanson

[11] Patent Number: 4,819,441

[45] Date of Patent: Apr. 11, 1989

[54] TEMPERATURE CONTROLLER FOR A TRANSPORT REFRIGERATION SYSTEM

[75] Inventor: Jay L. Hanson, Bloomington, Minn.

[73] Assignee: Thermo King Corporation, Minneapolis, Minn.

[21] Appl. No.: 20,259

[22] Filed: Feb. 27, 1987

[51] Int. Cl.[4] .......................... F25B 1/00; F25B 49/00; G05D 23/20

[52] U.S. Cl. ........................................ 62/160; 62/126; 62/158; 62/228.4; 62/228.5; 62/229

[58] Field of Search ................. 62/160, 159, 158, 157, 62/234, 155, 228.1, 228.4, 228.5, 196.2, 196.4, 126, 229, 323.1; 165/26

[56] References Cited

U.S. PATENT DOCUMENTS

| | | | |
|---|---|---|---|
| 4,161,880 | 7/1979 | Prosky | 73/342 |
| 4,234,927 | 11/1980 | First | 364/557 |
| 4,257,238 | 3/1981 | Kountz et al. | 62/176 B |
| 4,288,853 | 9/1981 | Uesugi | 364/557 |
| 4,292,813 | 10/1981 | Paddock | 62/158 |
| 4,299,095 | 11/1981 | Cassarino | 62/155 |
| 4,313,308 | 2/1982 | Boratgis et al. | 62/126 |
| 4,325,224 | 4/1982 | Howland . | |
| 4,358,936 | 11/1982 | Ito et al. | 62/229 |
| 4,380,155 | 4/1983 | Paddock | 62/229 |
| 4,381,549 | 4/1983 | Stamp, Jr. et al. | 62/160 |
| 4,403,296 | 9/1983 | Prosky | 364/573 |
| 4,419,866 | 12/1983 | Howland . | |
| 4,443,117 | 4/1984 | Mursmoto et al. . | |
| 4,455,095 | 6/1984 | Bleiker | 374/39 |
| 4,463,436 | 7/1984 | Veneklase | 364/557 |
| 4,493,191 | 1/1985 | Hanson | 62/126 |
| 4,504,010 | 3/1985 | Sukimoto et al. | 236/46 F |
| 4,504,922 | 3/1985 | Johnson et al. | 364/557 |
| 4,535,598 | 8/1985 | Mount | 62/226 X |
| 4,549,504 | 10/1985 | Games et al. | 123/41.01 |
| 4,685,306 | 8/1987 | Howland et al. | 62/200 X |

FOREIGN PATENT DOCUMENTS

| | | |
|---|---|---|
| 0104872 | 4/1984 | European Pat. Off. . |
| 2528551 | 12/1983 | France . |
| 2060215 | 4/1981 | United Kingdom . |
| 2075724 | 11/1981 | United Kingdom . |
| 2174510 | 11/1986 | United Kingdom . |

Primary Examiner—Harry B. Tanner
Attorney, Agent, or Firm—D. R. Lackey

[57] ABSTRACT

A ratiometric temperature controller for a transport refrigeration system, and a method of controlling the load temperature of a transport refrigeration system with digital signals, without the necessity of utilizing a digital computer. The method, implemented by the ratiometric controller, includes the steps of providing an analog ratio between the load temperature and a selected set point temperature, converting the analog ratio to a digital signal, and providing a logic array which is programmed to provide a plurality of transport refrigeration system control signals in response to predetermined values of the digital signal.

16 Claims, 4 Drawing Sheets

| MODE TEMP. FALLING ↓ | DIGITAL SIGNAL MSB        LSB | | | | | | | | WORD # | TEMP. RE: SET POINT °F | |
|---|---|---|---|---|---|---|---|---|---|---|---|
| | A | B | C | D | E | F | G | H | | | |
| SENSOR OPEN | 0 | 0 | 0 | 0 | 0 | 0 | 0 | 0 | 1 | +166 | SENSOR OPEN |
| OUT OF RANGE H.S. COOL | 0 | 1 | 1 | 1 | 0 | 1 | 1 | 1 | 119 | +11.7 | OUT OF RANGE H.S. COOL |
| | 0 | 1 | 1 | 1 | 1 | 0 | 0 | 0 | 120 | +10.4 | |
| IN RANGE H.S. COOL | 0 | 1 | 1 | 1 | 1 | 0 | 0 | 1 | 121 | +9.1 | L.S. COOL FOR 8 MIN. & THEN H.S. COOL |
| | 0 | 1 | 1 | 1 | 1 | 0 | 1 | 0 | 122 | +7.8 | |
| | 0 | 1 | 1 | 1 | 1 | 0 | 1 | 1 | 123 | +6.5 | |
| | 0 | 1 | 1 | 1 | 1 | 1 | 0 | 0 | 124 | +5.2 | |
| L.S. COOL | 0 | 1 | 1 | 1 | 1 | 1 | 0 | 1 | 125 | +3.9 | L.S. COOL UNLOADED |
| | 0 | 1 | 1 | 1 | 1 | 1 | 1 | 0 | 126 | +2.6 | |
| L.S. COOL UNLOADED | 0 | 1 | 1 | 1 | 1 | 1 | 1 | 1 | 127 | +1.3 | |
| L.S. HEAT UNLOADED | 1 | 0 | 0 | 0 | 0 | 0 | 0 | 0 | 128 | SET POINT | L.S. HEAT UNLOADED |
| | 1 | 0 | 0 | 0 | 0 | 0 | 0 | 1 | 129 | −1.3 | L.S. HEAT |
| | 1 | 0 | 0 | 0 | 0 | 0 | 1 | 0 | 130 | −2.6 | |
| L.S. HEAT FOR 8 MIN. & THEN H.S. HEAT | 1 | 0 | 0 | 0 | 0 | 0 | 1 | 1 | 131 | −3.9 | H.S. HEAT |
| | 1 | 0 | 0 | 0 | 0 | 1 | 0 | 0 | 132 | −5.2 | |
| OUT OF RANGE H.S. HEAT | 1 | 0 | 0 | 0 | 0 | 1 | 0 | 1 | 133 | −6.5 | OUT OF RANGE H.S. HEAT |
| | 1 | 0 | 0 | 0 | 0 | 1 | 1 | 0 | 134 | −7.8 | |
| SENSOR SHORT | 1 | 1 | 1 | 1 | 1 | 1 | 1 | 1 | 256 | −166 | SENSOR SHORT ↑ MODE TEMP. RISING |

FIG. 4

TEMPERATURE CONTROLLER FOR A TRANSPORT REFRIGERATION SYSTEM

BACKGROUND OF THE INVENTION

1. Field of the Invention

The invention relates in general to transport refrigeration systems, and more specifically to new and improved temperature controllers, and methods of controlling the load temperature of such refrigeration systems.

2. Description of the Prior Art

Transport refrigeration systems for trailers and trucks have many different operating control arrangements for improving load temperature control while reducing fuel costs of the internal combustion engine, such as a Diesel engine, which commonly drives the refrigeration compressor. For example, it is common to employ a plurality of different heating and cooling modes, depending upon where the load temperature is relative to the set point temperature. In a cooling mode, in which the load requires cooling to maintain the set point, the hot gas output from the compressor is directed through a first fluid circuit which includes a condenser, expansion valve, and evaporator. In a heating mode, in which the load requires heating to maintain the set point, or in which the evaporator requires defrosting, the hot gas is directed through a second fluid circuit which by-passes the condenser and goes directly to an evaporator defrost pan heater and then through the evaporator.

To provide different heating and cooling capacities, it is common to operate the compressor at one of two different speeds, called high speed and low speed. Still additional capacity control may be provided by operating the compressor partially unloaded during the low speed heating and cooling modes.

In an effort to conserve fuel, when a shift from low speed to high speed is called for by the load temperature control, it is known to delay the change from low to high speed to insure that the requirement is not transitory. If the system is still calling for high speed heating or cooling after the time delay, then the shift to high speed is made. U.S. Pat. No. 4,325,224, which is assigned to the same assignee as the present application, sets forth examples of different heating and cooling modes, including partial heating and cooling modes via compressor unloading, and the use of time delays between low and high speed modes.

In a further effort to conserve fuel, instead of operating the compressor continuously, there are times when the compressor and its driving engine may be turned off for significant periods of time without deleteriously affecting load temperature. U.S. Pat. No. 4,419,866, which is assigned to the same assignee as the present application, discloses the alternative use of either continuous or start-stop compressor operating modes.

It would be desirable, and it is the object of the present invention to provide a new and improved temperature controller for transport refrigeration systems, as well as new and improved methods of operating a transport refrigeration system which apparatus and methods are extremely versatile, enabling the temperature controllers of such systems to be easily and economically programmed to provide a transport refrigeration system tailored to a users unique requirements, without the necessity of resorting to the use of digital computers, such as microprocessors, for such programming.

In order to reduce the length and complexity of the present application, the hereinbefore mentioned U.S. Pat. Nos. 4,325,224 and 4,419,866 are hereby incorporated into the present specification by reference.

SUMMARY OF THE INVENTION

Briefly, the present invention is a new and improved temperature controller for transport refrigeration systems, and new and improved methods of controlling a transport refrigeration system. The method includes the step of first providing an analog ratio between the load temperature and the set point temperature. The method then continues by converting the analog ratio to a digital signal in a digital to analog converter, including scaling the converter inputs such that the set point is at the midpoint of the possible number of bit changes from all logic zeros to all logic ones. Further, the scaling and the number of bits in the digital signal are selected such that all logic zeros and all logic ones represent implausible temperature deviations from the set point. Thus, a digital signal in which all the bits are logic zero or logic one may conveniently be used to provide a sensor failure signal.

The method then includes the step of providing one or more low cost programmable logic arrays, hereinafter referred to as PLA, which are quickly and easily programmed to utilize different values of the digital signal to provide a plurality of different control signals which may initiate any desired number of different heating and cooling modes, as well as recognize events which may be used to start external timers. The timers then provide signals for the PLA which initiate, maintain, or terminate, predetermined heating and cooling modes, as desired.

The new and improved apparatus is a programmable ratiometric temperature controller which includes a load temperature sensor and temperature set point potentiometer in a voltage divider arrangement which provides an analog ratio between the set point temperature and the load temperature. An indication of the set point selected is also derived from same voltage divider. Analog to digital converters, programmable logic arrays, and programmable timers are utilized to provide many features from the value and bit changes of a digital signal responsive to the analog ratio, including:

1. Four or six stage control, with compressor unloader stages being added to achieve six stage operation;
2. Heat lock-out at temperature set points below a predetermined temperature, with an output being provided when heat lock out occurs, for failed sensor, fail-safe mode selection;
3. A sensor warning output when the sensor fails in an open or shorted mode;
4. A four minute in-range timer which allows pre-trip checkout, eliminating false out-of-range indication and premature high speed delay;
5. An eight minute delay to high speed after the load temperature has remained in a predetermined range about the set point for four minutes;
6. An out-of-range indication when the load temperature has been in-range for four minutes followed by 30 minutes out-of-range;
7. A proportional fast-time selector for quickly bench testing the timers;
8. An analog output proportional to the selected set point for use by auxiliary devices;
9. Outputs for shutting the prime mover of the compressor off to conserve fuel, when the load temperature is close to the set point, when this fuel saving option is selected;

10. The temperature algorithm is quickly and easily modifiable for accommodating special requirements, including adding additional control stages, such as for unloading a 6 cylinder compressor, or a capacity modulating valve; and 11. The relays controlled by the ratiometric temperature controller are external, which eliminates the need for passing high currents through the circuit boards, as well as for ease in troubleshooting and field repair.

BRIEF DESCRIPTION OF THE DRAWINGS

The invention may be better understood and further advantages and uses thereof more readily apparent when considered in view of the following detailed description of exemplary embodiments, taken with the accompanying drawings, in which:

FIG. 4 is diagram which sets forth an exemplary digital algorithm which may be used in programming the programmable logic arrays shown in FIGS. 1 and 2.

DESCRIPTION OF THE PREFERRED EMBODIMENT

Figure 1:
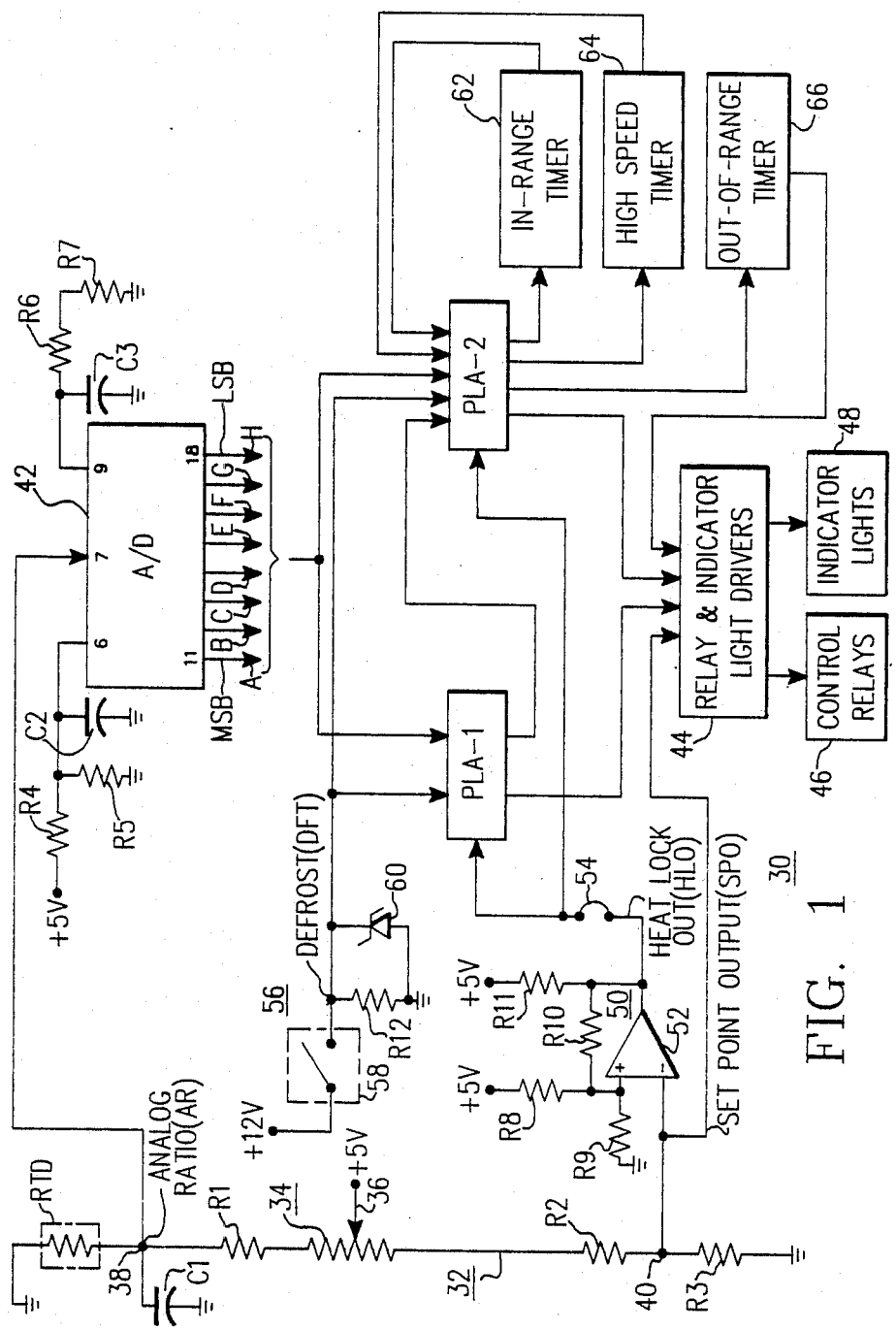
FIG. 1 is a partially schematic and partially block diagram of a new and improved programmable ratiometric temperature controller for a transport refrigeration system which may be used to practice the new and improved methods of the invention.

Referring now to the drawings, and to FIG. 1 in particular, there is shown a new and improved ratiometric temperature controller 30 which is constructed according to the teachings of the invention. A voltage divider 32 provides both a set point output SPO and an analog ratio AR. Voltage divider 32 includes a resistance temperature device RTD for sensing the temperature of the load whose temperature is to be controlled, and a capacitor C1 for lead compensation. The RTD, for example, may be Minco Products S409 which has a temperature range well within the control range requirements of a transport refrigeration system and a resistance change per degree of temperature change compatible with the associated circuitry. For example, it has a resistance of about 792 ohms at −20 degrees F. (−29 degrees C.) and a resistance of about 1025 ohms at 80 degrees F. (26 degrees C.).

Voltage divider 32 further includes a set point potentiometer (pot) 34 having a control arm 36 to which a regulated control voltage VCC is applied, such as +5 volts DC. Resistors R1, R2 and R3 complete the elements of the voltage divider 32, with the various elements being serially connected from ground to ground in the following order: RTD, R1, pot 34, R2 and R3. The junction 38 between RTD and R1 provides the analog ratio AR between the load temperature and the temperature selected by pot 34; and the junction 40 between R2 and R3 provides the set point output SPO.

When the resistance of RTD equals the resistance of R1 plus the setting of pot 34, the temperature of the controlled load is at the set point temperature, and the voltage AR at junction 38 will be equal to 50% of VCC or 2.5 volts.

The analog ratio AR is applied to an analog to digital converter (A/D) 42, preferably of the type having differential analog voltage inputs, such as National Semiconductor's ADC0804. The inputs to A/D 42 are used as a ratiometric comparator which compares the voltage at input pin 7, which is a variable percentage of VCC, with fixed percentages of VCC at input pins 6 and 9. Resistors R4 and R5 form a voltage divider which applies a voltage equal to 60% of VCC to pin 6, and resistors R6 and R7 set the reference voltage at pin 9 to 10% of VCC. Capacitors C2 and C3 are filter capacitors. A/D 42 functions by subtracting the voltage at pin 7 from the voltage at pin 6, and the difference is compared with the reference voltage at pin 9. Thus, for example, when the analog ratio AR at pin 7 is equal to 50% of VCC, indicating the load temperature is equal to the set point temperature, the difference between pins 7 and 6 will be equal to 10% VCC, and thus the difference is equal to the reference voltage of pin 9.

Pins 11 through 18 provide an eight bit digital signal A through H, respectively, with pin 11 and bit A being the most significant bit (MSB) and with pin 18 and bit H being the least significant bit (LSB). With eight bits, there are 256 output bit combinations, with A/D 42 being 50% through the conversion when the voltage at pin 7 is 50% of VCC. Thus, when the load temperature is equal to the set point, the digital signal will be at digital word 128 or 1000 0000. The limits of the conversion are such that when the voltage at pin 7 is 60% of VCC, the conversion is complete, with the digital signal being at word 256 or 1111 1111, and when the voltage at pin 7 is 40% of VCC the digital signal is at the first word or 0000 0000.

The inputs of A/D 42 are scaled such that a 1.3 degree F. change in load temperature produces a one bit change in the digital output signal A-H. This gives controller 30 a range of ±166 degrees F. from the set point, which is well beyond the controlled range of +80 degrees F. to −20 degrees F. Thus, if all of the bits of the digital signal A-H ever have the same logic level, it indicates that RTD is faulty. All logic zeros indicate that sensor RTD is open, and all logic ones indicate that sensor RTD is shorted.

Pot 34 and resistors R2 and R3 form a voltage divider which provides a voltage SPO at junction 40 which is proportional to the temperature set point. The set point output SPO is applied to an output driver for set point monitoring, and for such auxiliary functions as turning on an external defrost timer at set points below a predetermined value, such as 45 degrees F. The output drivers and control, which are shown generally at 44, may be VN10KM V.M.O.S. power F.E.T. transistors, for example, which drive external relays 46 and indicator lights 48 for controlling and monitoring the associated transport refrigeration system.

The set point output SPO is also used by a heat lockout function 50 which is activated when the set point temperature selected by pot 34 is below a predetermined temperature, e.g., 20 degrees F. If this function is desired, heating modes for controlling the load temperature will be locked out or prevented when the selected set point is below the heat lock-out temperature of 20 degrees F. Heat lock-out function 50 includes an operational amplifier (op amp) 52, resistors R8, R9, R10 and R11, and VCC. Resistors R8 and R9 and VCC provide a voltage divider which applies a voltage to the noninverting input of op amp 52 which is equal to the voltage SPO when pot 34 is set to a set point temperature of 20 degrees F. Resistor R10 is a feedback resistor used for hysteresis to prevent switch-over hunt when SPO is at or near the 20 degree F. switch point, and resistor R11 is a pull-up resistor required because op amp 52 is an open collector device.

In the operation of the heat lock-out function 50, when the set point selected on pot 34 is above the 20 degree F. switch point selected for purposes of example, the output HLO of op amp 52 will be a logic zero. When the set point is below 20 degrees F., the output HLO of op amp 52 switches to a logic one. The heat lock-out feature may be deactivated by opening jumper 54.

An external defrost function is indicated generally at 56. It provides a defrost signal DET which is a logic one when defrost is required. For example, a relay contact 58 may close and provide a regulated five volt signal DFT via a twelve volt supply voltage, a resistor R12 and a Zener diode 60.

The digital signal A-H, the heat lock-out signal HLO and the defrost signal DFT are decoded according to digital algorithms in programmable logic arrays, such as logic arrays PLA-1 and PLA-2. For example, logic array PLA-1 may be array PAL14H4 which has 14 inputs and 4 outputs, and logic array PLA-2 may be array PAL12H6 which has 12 inputs and 6 outputs. Such arrays, which include a plurality of logic gates, such as AND gates, OR gates, and inverter gates, are user programmable using standard PROM programmers with appropriate software. All that is necessary is to write a Boolean algebraic equation for each function and input the equation into the array via the PROM programmer, which then blows the proper fuse links to set up the gating logic which will cause the appropriate output to go high whenever the proper inputs are present.

Temperature controller 30 is completed by three programmable timers 62, 64 and 66, such as National Semiconductor's CD4541BC. Timer 62 is used as an in-range timer which eliminates false out-of-range indications, and premature high speed delay, as will be hereinafter explained. Timer 62 is started by PLA-2 when the load temperature first enters a predetermined temperature range relative to the set point temperature, such as 10.4 degrees F. above the set point temperature and 6.5 degrees F. below the set point temperature. This now provides time, four minutes, for example, for an operator to make a pre-trip checkout of the controller 30 without setting or latching out-of-range and high speed delay functions, as these functions will not set or latch until the in-range timer 62 times out and provides a timed-out signal for PLA-2.

Timer 64 is used to provide a predetermined delay, such as eight minutes, before switching the prime mover and compressor from low speed to high speed, for fuel saving reasons. If the controller is still calling for a high speed mode after the delay, then the high speed command will be implemented.

Timer 66 is used to provide an indication that the load temperature has gone out of range for a predetermined period of time, such as 30 minutes, if the load temperature had been in range for the period of time required for the in-range timer 62 to time out, e.g., four minutes in the example.

Figure 2:
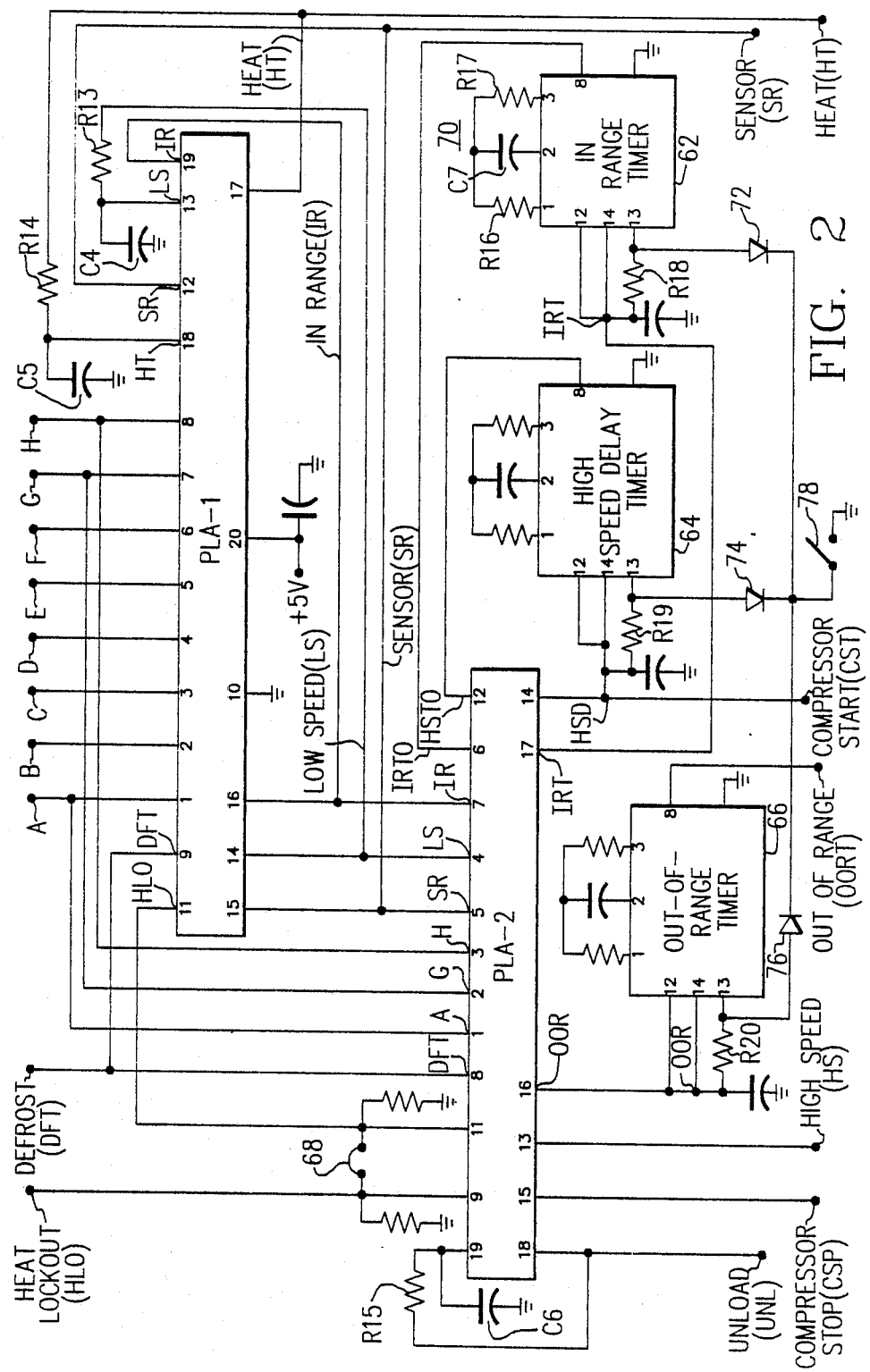
FIG. 2 is a more detailed schematic diagram of certain of the functions shown in block form in FIG. 1.
Figure 3:
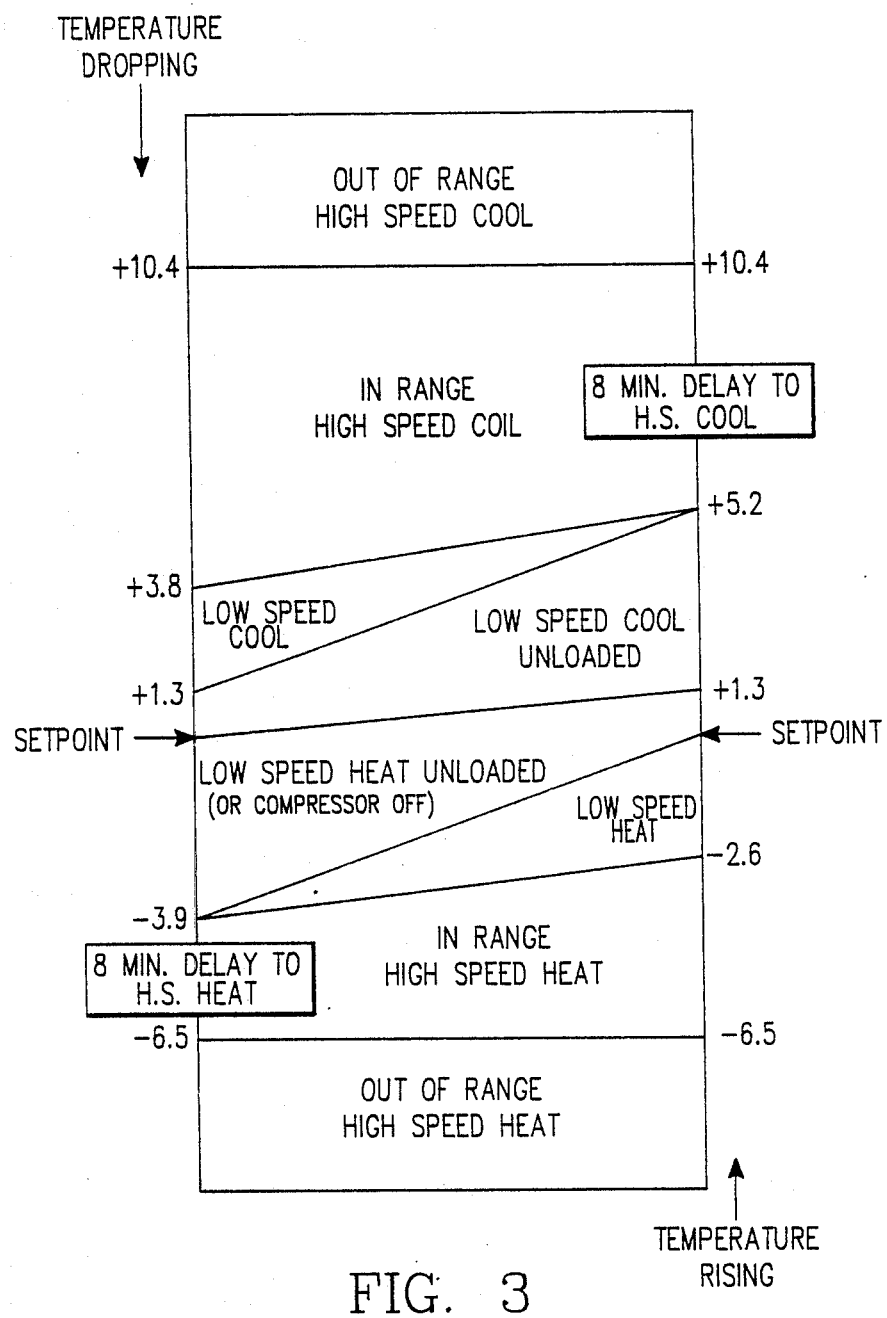
FIG. 3 is a diagram which sets forth cooling and heating modes which may be implemented by the methods of the invention.

FIG. 2 is a detailed schematic diagram of the programmable logic arrays PLA-1 and PLA-2 and the programmable timers 62, 64 and 66. This diagram, as well as the diagrams of FIGS. 3 and 4 will be referred to during the following description of how the arrays are programmed according to the teachings of the invention. FIG. 3 illustrates the different heating and cooling modes which the controller 30 will provide, for a falling load temperature starting at the top of the diagram and proceeding downwardly along the left-hand side of the diagram, and for a rising load temperature starting at the bottom of the diagram and proceeding upwardly along the right-hand side of the diagram. FIG. 4 sets forth a digital algorithm which shows the different digital signals which will trigger the different heating and cooling modes.

As shown in FIG. 2, logic array PLA-1 has four outputs IR (in-range), LS (low speed), SR (sensor) and HT (heat). These four outputs are also fed back to four of the fourteen inputs. Additional inputs are provided by the digital signal A-H, the defrost signal DFT, and the heat lock-out signal HLO from input terminal HLO via a jumper 68.

Logic array PLA-2 has six outputs UNL (unload), CSP (compressor stop), HS (high speed), OOR which starts the out-of-range timer 66, IRT which starts the in-range timer 62, and HSD which starts the high speed delay timer 64 and also functions as signal CST which starts the compressor. The inputs of PLA-2 include its own unload signal UNL, the heat lock-out signal HLO, the defrost signal DFT, bits A, G and H from the digital signal A-H, sensor signal SR, low speed signal LS, in-range signal IR, a timed-out signal IRTO from the in-range timer 62, and a timed-out signal HSTO from the high speed delay timer 64.

Jumpers 54 and 68 shown in FIGS. 1 and 2, respectively, determine the heat lock-out mode. If jumpers 54 and 68 are both in place, there is total heat lock out, both low and high speed, when the set point is below the heat lock out switch point. If only jumper 68 is removed, only high speed heat will be locked out. Removal of jumper 54 eliminates all heat lock-out. Of course, regardless of which heat lock-out mode is selected, a true defrost signal DFT will force the high speed heat mode.

Programming of the logic arrays will now be described for providing signals which will go true at the appropriate times to implement the diagrams shown in FIGS. 3 and 4.

Sensor SR

The sensor output SR from pin 15 of PLA-1 goes true or to the logic one level when sensor RTD fails in an open or shorted condition, causing the digital signal to be all logic ones or all logic zeros. The digital signal A-H would be directly connected to a first 8-input AND gate, and it would be connected to another 8-input AND gate via inverter gates. The outputs of the two AND gates would be connected to the inputs of a two input OR gate. The output of the OR gate would provide signal SR, which would go true anytime all of the digits of the digital signal A-H have the same logic level. The Boolean expression used to program PLA-1 is as follows:

$$SR = A*B*C*D*E*F*G*H + /A*/B*/C*/D*/E*/F*/G*/H$$

In-range IR

The in-range signal IR at pin 16 of PLA-1 is true, as indicated in FIG. 4, during digital words 120 through 132. To decode this range requires an equation for words 120–123, an equation for words 124–127, an equation for words 128–131, and an equation for word 132. The Boolean expression is as follows:

$$IR = /A*B*C*D*E*/F + /A*B*C*D*E*F\\ + A*/B*/C*/D*/E*/F + A*/B*/C*/D\\ */E*/F*/G*H$$

Low Speed LS

Low speed output LS from pin 14 of PLA-1 is true, as indicated on the digital algorithm in FIG. 4, during words 125 to 129, with a one bit hysteresis feedback to input pin 13. Resistor R13 and capacitor C4 are used for hysteresis during the transition from word 125 to word 124 and from word 129 to word 130. The RC time constant provided by R13 and C4 will hold the low speed output LS high until the analog to digital transition is complete. The Boolean expression for low speed is as follows:

$$LS = IR*E*F*H + IR*LS*E*F*/H + IR*/E*/F*/\\ G + IR*LS*/E*/F*/H$$

Heat HT

Heat output HT from pin 17 of PLA-1 is true during words 128 through 255, with a one bit hysteresis feedback to input pin at word 127 via resistor R14 and capacitor C5. When defrost input DFT is true, signal HT will be high regardless of any heat lock-out mode or failed sensor indication via signal SR. The Boolean expression is as follows:

$$HT = A*/SR*/HLO + HT*/A*B*C*D*E*F*G*H*/\\ HLO + DFT$$

Unload UNL

The unload output UNL from pin 18 of PLA-2, which controls compressor unloading, goes true at word 128 and untrue or low when low speed LS terminates. There is a hysteresis feedback to input pin 19 via resistor R15 and capacitor C6. The Boolean expression is as follows:

$$UNL = /SR*/DFT*LS*/A*G*H* + /SR*/DFT*L\text{-}\\ S*UNL + A*/SR*DFT*HLO$$

In-range Timer IRT

The in-range timer output IRT from pin 17 of PLA-2 is used to eliminate a false out-of-range indication and premature high speed delay. When signal IR from PLA-1 goes high, PLA-2 provides a true output IRT which is applied to input pin 14 of the in-range timer 62. The resistor-capacitor network 70 connected to pins 1, 2 and 3, which network includes resistors R16 and R17 and capacitor C7, determines the time-out time of the timer, which is four minutes in the example. Pins 4 through 7 and 9 through 11 are grounded, to set the timer for a one-time time-out of four minutes. If the in-range signal IR is present continuously for four minutes, the timer will time out and pin 8 will go high and stay high as long as input pin 14 is high. To keep the in-range timer 62 latched, the output IRTO at pin 8 is fed back to input pin 6 of PAL-2. This will keep the output at pin 17 of PAL-2 high, and timer 62 latched even if the in-range input IR goes low. To clear timer 62 once it times out and latches requires that power to the timer be removed. The Boolean expression for the in-range timer starting signal IRT is as follows:

$$IRT = IR + IRTO$$

Out-of-range OOR

The out-of-range signal OOR from pin 16 of PLA-2 goes true if the load temperature goes out of range after the in-range timer 62 has timed out and latched. Signal OOR is used to start the out-of-range timer 66. Timer 66 is set to time out in thirty minutes. Thus, if signal OOR persists for thirty minutes, timer 66 will time out and provide a true out-of-range signal OORT. Signal OORT will remain true as long as the input signal OOR remains true. Should the load temperature go back into range, signal OOR will become untrue and timer 66 will clear and reset, thus switching its output OORT back to logic zero. The Boolean expression for the out-of-range signal OOR is as follows:

$$OOR = IRTO*/SR*/IR*/A + IRTO*/SR*/IR*A*/\\ HLO$$

Compressor Stop CSP

If the start-stop prime mover and compressor mode is activated by an external switch, this mode will receive a compressor stop signal CSP from pin 15 of PLA-2. Signal CSP goes high when the load temperature is at or very close to the set point temperature. Signal CSP will not go high if the sensor has failed, i.e., SR is true, or if a true defrost signal DFT is present. The Boolean expression for compressor stop CSP is as follows:

$$CSP = /SR*/DFT*HT*UNL + /SR*/DFT*G*H$$

High Speed Delay HSD

The high speed delay output HSD from pin 14 of PLA-2 is enabled when the in-range timer 62 times out and latches. Signal HSD is applied to the trigger input of high speed delay timer 64. When a high speed mode is called for in order to maintain the load set point, as indicated in the diagrams of FIGS. 3 and 4, the implementation of the high speed mode is delayed for a predetermined period of time, such as eight minutes, for fuel saving purposes. If high speed is still called for after timer 64 times out and provides a true timed out signal HSTO, then a true high speed signal HS will be provided from output pin 13, as will be hereinafter explained. If signal HSD goes low, the high speed timer 64 will clear and reset.

In the fuel saving option which starts and stops the prime mover and compressor, output HSD is also available as output CST which will restart the prime mover and compressor. Also, a true defrost signal DFT will by-pass the high speed delay.

The Boolean expression for high speed delay HSD is as follows:

$$HSD = /UNL*/LS*/SR*/A*IRTO + \\ /UNL*/LS*/SR*A*IRTO*/HLO$$

High Speed Output HS

The high speed output from pin 13 of PLA-2 goes high when a high speed mode has been called for the period of the high speed delay timer. A true defrost signal DFT will force signal HS true regardless of any heat lock-out mode or a failed sensor RTD. The Boolean expression for the high speed output HS is as follows:

$$HS = /LS*/SR*/A*/IRTO + /LS*/SR*A*/HLO*\\ /IRTO + DFT + HSTO$$

Fast Bench Time Testing

Timers 62, 64 and 66 each have an internal 16-stage binary counter which counts the pulses generated by the resistor-capacitor network connected to pins 1, 2 and 3, such as the network 70 associated with timer 62. Pins 12 and 13 determine at what count the output at pin 8 will go high. The timers are set up for a normal time count of 65,536 pulses when pins 12 and 13 are both high. By forcing pin 13 low with pin 12 high, the timer will time out with a count of 256 pulses. This result is achieved by connecting pins 13 of timers 62, 64 and 66 to ground via blocking diodes 72, 74 and 76 via a jumper 78. Resistors R18, R19 and R20 are used as current limiters.

I claim as my invention:

1. A method of controlling the load temperature of a transport refrigeration system with digital signals, comprising the steps of:

selecting a set point temperature, sensing the load temperature of the transport refrigeration system, providing an analog ratio between the set point temperature and the load temperature, converting the analog ratio to a digital signal having a predetermined number of bits, providing a logic array programmed to provide a plurality of transport refrigeration system control signals in response to predetermined values of the digital signal, programming the logic array to provide a true first in-range signal when the load temperature sensed by the sensing step is within a predetermined temperature range, which range includes the set point temperature selected by the selecting step, timing the duration of the true first in-range signal, and providing a second in-range signal which goes true when the first in-range signal remains true for a predetermined period of time, and delaying at least one predetermined additional timing function of the transport refrigeration system until the second in-range signal goes true.

2. The method of claim 1 wherein the step of providing the analog ratio includes the steps of:

constructing a voltage divider using a potentiometer having a movable control arm for selecting the set point, and a load temperature sensor, connecting a predetermined regulated control voltage to the control arm, deriving the analog ratio from the voltage divider, and additionally deriving a signal responsive to set point from said voltage divider.

3. The method of claim 1 wherein the step of converting the analog ratio to a digital signal includes the step of scaling the analog input to provide a digital signal in which each bit change indicates a predetermined change in load temperature, with said predetermined change in load temperature and the total number of possible bit changes in the digital signal providing a temperature range from all logic zeros to all logic ones which is outside the practical range of load temperatures, and including the step of programming the logic array to provide a control signal which indicates load temperature sensor failure in response to a digital signal in which the bits all have the same logic level.

4. The method of claim 3 including the steps of:

deriving a set point temperature output from the voltage divider, providing a heat lock-out reference voltage indicative of a predetermined frozen load temperature below which the use of heat for controlling the load temperature may be prevented, comparing said derived set point temperature output with said heat lock-out reference voltage, and providing a true heat lock-out logic signal when the comparison step indicates the set point temperature selected is below the predetermined heat lock-out temperature represented by the heat lock-out reference voltage.

5. The method of claim 1 including the step of latching the second in-range signal when it goes true, to preserve said true second in-range signal notwithstanding the first in-range signal subsequently becoming untrue.

6. The method of claim 5 wherein the at least one predetermined additional timing function which is delayed until the second in-range signal goes true is an out-of-range timing function, and including the steps of:

programming the logic array to detect when a true first in-range signal becomes untrue, after the second in-range signal has been latched, timing the duration of an untrue first in-range signal upon detection by said detecting step, and providing a true out-of-range signal in response to the timing step when the untrue first in-range signal persists for a predetermined period of time.

7. The method of claim 5 wherein the at least one predetermined additional timing function which is delayed until the second in-range signal is provided is a high speed delay function, and including the steps of:

programming the logic array to provide true high speed cool, low speed cool, low speed cool unloaded, low speed heat unloaded, and high speed heat delay signals, in the recited order, at predetermined values of the digital signal as the temperature of the load drops to and then below the set point temperature, delaying said high speed heat delay signal until after the second in-range signal has been provided, in the absence of the second in-range signal at the time the high speed heat delay signal would normally be provided, timing the duration of a true high speed heat delay signal, providing a true high speed heat signal after the timing step has timed a predetermined period of time, and providing low speed heat during the delay period.

8. The method of claim 5 wherein the at least one predetermined additional timing function which is delayed until the second in-range signal is provided is a high speed delay function, and including the steps of:

programming the logic array to provide true high speed heat, low speed heat, low speed heat unloaded, low speed cool unloaded, and high speed cool delay signals, in the recited order, at predetermined values of the digital signal as the temperature of the load rises to and then above the set point temperature, delaying said high speed cool delay signal until after the second in-range signal has been provided, in the absence of the second in-range signal at the time the high speed cool delay signal would normally be provided, timing the duration of a true high speed cool delay signal, providing a true high speed cool signal after the timing step has timed a predetermined period of time, and providing low speed cool during the delay period.

9. A load temperature controller for a transport refrigeration system comprising:
selector means for selecting a set point temperature,
sensor means for sensing the load temperature of the transport refrigeration system,
means for providing an analog ratio between the selected set point temperature and the sensed load temperature,
converter means for converting the analog ratio to a digital signal having a predetermined number of bits,
logic array means programmed to provide a plurality of transport refrigeration system control signals in response to predetermined values of the digital signal,
said logic array means providing a true first in-range signal when the load temperature sensed by the sensor means is within a predetermined temperature range, which range includes the set point temperature selected by the selector means,
in-range timer means for timing the duration of the true first in-range signal, said logic array means providing a second in-range signal which goes true in response to said in-range timer means when the first in-range signal remains true for a predetermined period of time,
and at least one additional timer for timing a predetermined function of the load temperature controller, said at least one additional timer being enabled by said second in-range signal.

10. The controller of claim 9 wherein the selector means includes a potentiometer having a movable control arm for selecting the set point temperature, and the means for providing the analog ratio includes a voltage divider which uses said potentiometer and the sensor means, and including a predetermined regulated control voltage connected to the control arm of said potentiometer, and wherein an indication of the selected set point temperature is also provided by said voltage divider.

11. The controller of claim 9 wherein the converter means includes analog inputs scaled to provide a digital signal in which each bit change indicates a predetermined change in load temperature, with said predetermined change in load temperature and the total number of possible bit changes in the digital signal providing a temperature range from all logic zeros to all logic ones which is outside the practical range of load temperatures,
and wherein the logic array means provides a control signal which indicates failure of the sensor means in response to a digital signal in which the bits all have the same logic level.

12. The controller of claim 11 including means deriving a set point temperature output from the voltage divider,
means providing a heat lock-out reference voltage indicative of a predetermined frozen load temperature below which the use of heat for controlling the load temperature may be prevented,
comparator means for comparing said derived set point temperature output with said heat lock-out reference voltage,
and means for providing a true heat lock-out logic signal when said comparator means determines the selected set point temperature is below the predetermined heat lock-out temperature represented by the heat lock-out reference voltage.

13. The controller of claim 9 wherein the logic array means includes means latching the second in-range signal when it goes true, to preserve said true second in-range signal notwithstanding the first in-range signal subsequently becoming untrue.

14. The controller of claim 13 wherein the at least one additional timer is an out-of-range timer, and wherein the logic array means detects when a true first in-range signal becomes untrue, after the second in-range signal has been latched, and wherein the out-of-range timer times the duration of an untrue first in-range signal upon detection by said detecting step, with said logic array means providing a true out-of-range signal in response to the out-of-range timer when the untrue first in-range signal persists for a predetermined period of time.

15. The controller of claim 13 wherein the at least one additional timer is a high speed delay timer, and wherein the logic array means provides true high speed cool, low speed cool, low speed cool unloaded, low speed heat unloaded, and high speed heat delay signals, in the recited order, at predetermined values of the digital signal as the temperature of the load drops to and then below the set point temperature, and wherein the high speed delay timer times the duration of a true high speed heat delay signal which follows a true second in-range signal, with the logic array means providing a true high speed heat signal after the high speed delay timer has timed a predetermined period of time.

16. The controller of claim 13 wherein the at least one additional timer is a high speed delay timer, and wherein the logic array means provides true high speed heat, low speed heat, low speed heat unloaded, low speed cool unloaded, and high speed cool delay signals, in the recited order, at predetermined values of the digital signal as the temperature of the load rises to and then above the set point temperature, and wherein the high speed delay timer times the duration of a true high speed cool delay signal which follows a true second in-range signal, with the logic array means providing a true high speed cool signal after the high speed delay timer has timed a predetermined period of time.

* * * * *